US006591422B1

(12) United States Patent
Cesar et al.

(10) Patent No.: US 6,591,422 B1
(45) Date of Patent: Jul. 8, 2003

(54) FACILITY FOR ASSIGNING TRANSMISSION CHANNELS TO TERMINALS OF A SERVICE-ON-DEMAND SYSTEM

(75) Inventors: Bozo Cesar, Kornweistheim (DE); Klaus Keil, Esslingen (DE); Joachim Riemer, Korntal (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/159,247

(22) Filed: Sep. 23, 1998

(30) Foreign Application Priority Data

Sep. 23, 1997 (DE) .......................... 197 41 885

(51) Int. Cl.[7] .......................... H04N 7/173; H04J 3/22
(52) U.S. Cl. .......................... 725/95; 725/96; 370/431
(58) Field of Search .................. 725/114–118, 121, 725/86–104; 370/229–350, 412, 418, 431, 433, 445, 147, 148, 137, 447, 442, 449, 461, 462, 437; 455/450, 451, 452

(56) References Cited

U.S. PATENT DOCUMENTS

| | | | |
|---|---|---|---|
| 4,961,186 A | * 10/1990 | Chandramouli et al. | 370/79 |
| 5,280,630 A | * 1/1994 | Wang | 455/56.1 |
| 5,363,428 A | * 11/1994 | Nagashima | 379/58 |
| 5,481,542 A | * 1/1996 | Logston et al. | 370/94.2 |
| 5,517,652 A | 5/1996 | Miyamoto et al. | |
| 5,553,071 A | * 9/1996 | Aranguren et al. | 370/85.3 |
| 5,752,192 A | * 5/1998 | Hamabe | 455/450 |
| 5,754,784 A | * 5/1998 | Garland et al. | 395/200.49 |

(List continued on next page.)

FOREIGN PATENT DOCUMENTS

EP 0698998 2/1996

OTHER PUBLICATIONS

Chang et al., An Open–Systems Approach to Video on Demand, May 1994, IEEE Communications Magazine 32, No. 5.*

(List continued on next page.)

Primary Examiner—John Miller
Assistant Examiner—Annan Shang
(74) Attorney, Agent, or Firm—Ware, Fressola, Van Der Sluys & Adolphson

(57) ABSTRACT

A service-on-demand system (SYS) includes a facility (EIN) which is designed to assign transmission channels to terminals (END1, END2). To accomplish this, the facility (EIN) contains two interfaces (S1, S2) for connecting it to two groups of terminals (END1, END2), a memory (MEMO) which holds an assignment table containing entries on currently available and currently busy transmission channels for transmitting services requested from terminals (END1, END2), with a variable assignment of transmission channels to terminals (END1, END2) being possible regardless of which group the terminals (END1, END2) belong to, and a control unit (CTRL) which coordinates the assignment. Only those transmission channels can be assigned which are considered currently available in the memory (MEMO). The transmission channels are not permanently assigned to groups but are largely freely available to all terminals (END1, END2). For example, a minimum number of freely available transmission channels may be reserved for each group, and the remaining channels may be used both by terminals of group 1 and by terminals of group 2, etc., depending on traffic volume and demand. This provides flexibility and adapts the assignment of transmission channels automatically to the traffic volume.

12 Claims, 1 Drawing Sheet

U.S. PATENT DOCUMENTS

| | | | | |
|---|---|---|---|---|
| 5,819,036 A | * | 10/1998 | Adams et al. | 395/200.33 |
| 5,847,600 A | * | 12/1998 | Williams et al. | 340/825.03 |
| 5,862,451 A | * | 1/1999 | Grau et al. | 455/5.1 |
| 5,875,300 A | * | 2/1999 | Kamel et al. | 394/200.49 |
| 5,943,047 A | * | 8/1999 | Suzuki | 345/327 |
| 6,028,860 A | * | 2/2000 | Laubach et al. | 370/395 |
| 6,052,555 A | * | 4/2000 | Ferguson | 455/5.1 |
| 6,070,077 A | * | 5/2000 | Kim et al. | 455/452 |
| 6,237,146 B1 | * | 4/2001 | Richards et al. | 725/100 |
| 6,487,405 B1 | * | 11/2002 | Dapper | 455/424 |

OTHER PUBLICATIONS

"Aufbruch in die interaktive Medien–Zukunft" by Horts Autzen in Elektronik, May 1995.

"An Open–Systems Approach to Video on Demand" by Yee–Hsian Cjang et al, 2460 IEEE Communications Magazine, May 1994 (No. 5, NY, NY pp. 68–80).

* cited by examiner

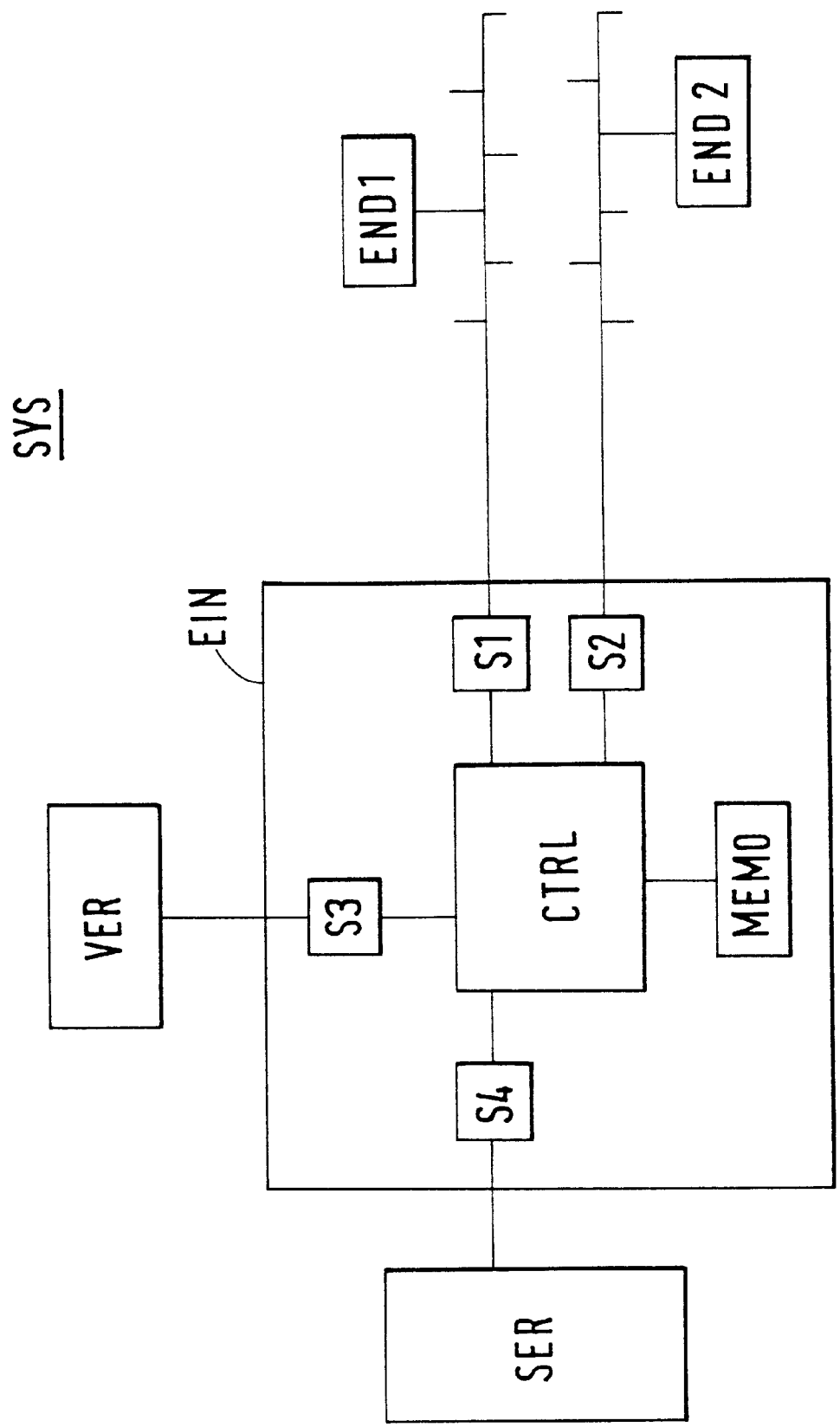

FACILITY FOR ASSIGNING TRANSMISSION CHANNELS TO TERMINALS OF A SERVICE-ON-DEMAND SYSTEM

TECHNICAL FIELD

This invention relates to a facility for assigning transmission channels to terminals of a service-on-demand system.

BACKGROUND OF THE INVENTION

A service-on-demand system is known, for example, from the journal "Elektronik" 5/1995, pages 50 to 58. The service-on-demand system contains a server which is connected by an ATM network to a number of hubs which, in turn, are connected to a plurality of BONTs (BONT=Broadband Optical Network Termination). 64 terminals are connected to each BONT via a common coaxial cable. To request a service, a terminal sends a connection request to the server by means of its set-top box. The server makes available to the terminal a transmission channel over which the requested service is transmitted optically to the BONT and then electrically to the terminal. A given number of transmission channels are commonly reserved for each BONT; for example, channels 1 to 32 are assigned to the first BONT, channels 33 to 64 to the second BONT, etc. This is a rigid scheme which only makes available to each terminal the same additional transmission capacity. As a result, for example, only a maximum of 32 of the 64 terminals of each group connected to the BONT can retrieve services simultaneously. If the system is expanded, e.g., by connecting further set-top boxes to an existing BONT, the entire system needs to be shut down to reconfigure the assignment of the transmission channels to the terminals and groups.

SUMMARY OF THE INVENTION

It is therefore an object of the invention to organize the assignment of transmission channels to terminals of a service-on-demand system in such a manner that the above disadvantages are avoided.

According to the invention, this object is attained by a facility for assigning transmission channels to terminals of a service-on-demand system, wherein at least two interfaces are provided for connecting the facility to a plurality of terminals, each of the interfaces being connected to a group of terminals by a separate line, that a memory is provided which holds an assignment table containing entries on currently available and currently busy transmission channels for transmitting services requested from terminals, with a variable assignment of transmission channels to terminals being possible regardless of which group the terminals belong to, that a control unit is provided which is connected to the interfaces and the memory, and that the control unit is adapted to receive connection requests from individual terminals for requesting services, to assign at least one transmission channel to each of the individual terminals in response thereto and store the assignment in the memory if in the memory the at least one transmission channel is considered currently available, and to notify the individual terminals that the establishment of a connection is not possible for the time being if in the memory all transmission channels are considered busy. The facility is characterized in that it provides for a variable assignment of transmission channels to terminals, regardless of which group the terminals belong to. For 64+64=128 terminals connected to two BONTs in two groups, for example, 64 transmission channels are provided. The transmission channels are not permanently assigned to the two groups, but are largely freely available to all terminals. For instance, channel 1 may be occupied by terminal 1 of group 1, and channel 2 by terminal 25 of group 2. To be able to reserve a minimum number of freely available transmission channels for each group, 16 of the 64 channels, for example, are reserved as a minimum number for group 1 and another 16 of the 64 channels are reserved as a minimum number for group 2. The remaining 32 channels are then available for use both by terminals of group 1 and by terminals of group 2, depending on traffic volume and demand. This provides flexibility and adapts the assignment of transmission channels automatically to the traffic volume. An added advantage is that more than one transmission channel can be assigned to each terminal, whereby the range of application is increased; for example, services with different transmission capacities for, e.g., different image qualities can be offered for different fees.

According to one advantageous aspect of the invention, the minimum number of reserved transmission channels can be dynamically varied. This offers the additional advantage of an even more flexible assignment of transmission channels. For example, after start-up of a new or expanded system, the minimum numbers can be changed and adapted to the current traffic volume without interrupting service, whereby optimum utilization of the available transmission capacity can be achieved.

According to another advantageous aspect of the invention, the transmission channels can be temporarily blocked in the memory in a virtual fashion. This has the advantage that even during a repair needed in the event of a failure of one or more transmission channels, the system remains limitedly operational as only the channels to be repaired are blocked in a virtual fashion and are thus considered busy.

BRIEF DESCRIPTION OF THE DRAWINGS

One embodiment of the invention will now be explained with reference to the accompanying drawing. The single FIGURE of the drawing is a schematic representation of a service-on-demand system with a channel assignment facility according to the invention.

BEST MODE FOR CARRYING OUT THE INVENTION

The service-on-demand system SYS contains a server SER, a management unit VER, a channel assignment facility EIN according to the invention, and a plurality of terminals END1, END2.

The server SER is connected to the plurality of terminals END1, END2 via the facility EIN and a point-to-multipoint connection. The server SER serves to make services available to the terminals END1, END2. The services available are, for example, pay-per-view, near-video-on-demand, video-on-demand, telelearning/teleteaching, information services, teleshopping, or telegames. Via a decoder, a so-called set-top box, the user of a terminal END1, END2 selects a service which is then made available to him or her by the server SER, e.g., by transfer of the requested video film. For the transfer, the server SER needs at least one free transmission channel. To receive the video film, the terminal END1, END2 must know which channel is being used by the server SER. To assign the channels, use is made of the facility EIN.

The facility EIN for assigning transmission channels to terminals END1, END2 comprises at least two interfaces S1, S2 for connecting it to a plurality of terminals END1, END2.

Each interface S1, S2 is connected to a group of terminals END1, END2 by a separate line, e.g., a coaxial cable. The interfaces S1, S2 serve as protocol converters, as send units for transmitting information from the facility EIN to the terminals END1, END2, and as receive units for receiving information from the terminals END1, END2.

The facility EIN further includes a memory MEMO, which holds an assignment table. The memory MEMO is, for example, a random-access memory (RAM), an electrically erasable programmable read-only memory (EEPROM), or a flash memory. The assignment table contains entries on currently available and currently busy transmission channels for transmitting services requested by terminals END1, END2. A channel is considered busy, for example, when it is being used for a transmission from the server SER to a given terminal END1, END2. In the case of a video-on-demand connection, for example, a transmission channel is made available exclusively to a given terminal END1, END2 so as to enable the latter to perform operations such as fast forward, fast return, or freeze frame. In the case of a near-video-on-demand connection, a transmission channel can also be used by two or more terminals END1, END2 simultaneously, since information flows in one direction only, namely from the server SER to the terminals END1, END2. The transmission channel is then considered busy as long as one of the terminals END1, END2 uses the near-video-on-demand service or until the transmission is terminated.

The assignment table is arranged in such a way that a variable assignment of transmission channels to the terminals END1, END2 is possible, regardless of which group the terminals belong to. This is illustrated by a numerical example: Group 1, which is connected to interface S1, contains 10 terminals END1, and group 2, connected to interface S2, contains 10 terminals END2. 10 transmission channels are provided for serving the 20 terminals END1, END2. On the basis of an estimated traffic volume, 10 channels should be sufficient to avoid bottlenecks, since, as a rule, never more than 50% of the terminals END1, END2 of a group want to use a service simultaneously. Thus it would suffice to assign 5 selected channels to group 1 and 5 other channels to group 2. Due to statistical tolerances in the estimation of the traffic volume, which disregarded, for example, a great demand from terminals END1 of group 1 as opposed to a moderate demand from terminals END2 of group 2, it may happen that 8 of the 10 terminals END1 of group 1, but only 2 of the 10 terminals END2 of group 2, want to use a service simultaneously. With a rigid assignment of 5 channels to group 1 and 5 channels to group 2, this would not be possible. For this reason, a variable assignment of the transmission channels is chosen which provides only 10 freely assignable channels for a total of 20 terminals END1, END2, regardless of which group the terminals belong to, so that a service can also be retrieved simultaneously by 8 terminals END1 of group 1 and 2 terminals END2 of group 2. In addition, a terminal END1, END2 can also be assigned more than one channel, e.g., 2 or 3, simultaneously.

The facility EIN further includes a control unit CTRL, which is connected to the interfaces S1, S2 and the memory MEMO. The control unit CTRL is, for example, a digital signal processor (DSP) or a microprocessor. It is suitable for receiving connection requests from individual terminals END1, END2 which want to access services. To that end, the control unit CTRL includes a signaling unit. The signaling unit detects a connection request from a terminal END1, END2 and then releases a control channel between server SER and terminal END1, END2, so that the terminal END1, END2 can request the desired service. The control unit CTRL then assigns to the terminal END1, END2 at least one transmission channel, which was selected from the channels available in the memory MEMO and adapted in number to the requested service. The requested service can then be made available to the terminal END1, END2 via the assigned channel or channels. In addition, the assigned channel or channels are noted in the memory MEMO as busy.

Only transmission channels which are considered currently available in the memory MEMO can be assigned. If all channels are considered busy in the memory MEMO, the individual terminals END1, END2 will be notified by the control unit CTRL that the establishment of a connection is not possible at the moment. The control unit CTRL may, for example, be programmed to monitor the memory MEMO after a notice to a terminal END1, END2 that the establishment of a connection is not possible, and to inform the respective terminal END1, END2 as soon as a channel is considered idle and is available again.

The control unit CTRL is suitable for carrying out the assignment of the transmission channels in such a way that for each group of terminals END1, END2, the number of assignable channels does not fall below a minimum value and does not exceed a maximum value, with the minimum and maximum values being unequal. A numerical example illustrates this: Group 1, which is connected to interface S1, contains 30 terminals END1, and group 2, which is connected to interface S2, contains 30 terminals END2. 30 transmission channels are provided for serving the 60 terminals END1, END2. 10 of the 30 channels are reserved for the terminals END1 of group 1. Another 10 of the 30 channels are reserved for the terminals END2 of group 2. It is unimportant which of the 30 channels are reserved; what is important is their absolute number. The absolute number 10 represents the minimum value which can be entered into the control unit CTRL during initialization of the system SYS. The remaining 10 channels can then be used both by terminals END1 of group 1 and by terminals END2 of group 2, so that a maximum value of 20 channels is obtained for each group. The maximum value can be entered into the control unit CTRL, e.g., manually through a keyboard, during initialization of the system SYS. If more channels than the maximum number, e.g., 21 instead of 20, are requested from a group of terminals END1; END2, and at the same time only 5 of the 10 channels assigned to the other group are busy, the requested 21st channel is considered busy for the first group even though 5 channels are still available, but only for use by the second group, so that they are blocked for the first group. A minimum number of channels is always available to each group of terminals END1; END2, in this example 10 channels.

The control unit CTRL may, for example, be programmed so as to be suitable for dynamically changing the minimum and/or maximum values; for example, after the initialization phase, the control unit CTRL may monitor the actual traffic volume and adapt the minimum and maximum values thereto. The dynamic changes of the minimum and maximum values are made without interrupting service, e.g., by entering the values by means of a keyboard or programming the control unit CTRL such that it performs the adaptation automatically. The latter is implemented by arranging, for example, that the control unit notes the number of channels simultaneously used by a group over a fixed period of time, e.g., one week, and subsequently fixes the maximum number of usages as a new minimum value for the respective group.

Furthermore, the control unit CTRL may be programmed to be suitable for temporarily blocking individual transmission channels or groups of transmission channels in the memory MEMO in a virtual fashion, so that these channels are considered busy. This has the advantage that, e.g., during a repair of a transmission signal, it is not necessary to shut down the entire system, but only the transmission channel to be repaired is not available to all terminals END1, END2 or to a group of terminals for the duration of the repair. Thus, during a repair of a channel, 19 of the 20 channels, for example, continue to be available to the terminals END1, END2. The capacity of the transmission channels available to a given number of terminals END1, END2 can also be varied by virtual blocking and unblocking of transmission channels. If the system is expanded, e.g., by connecting additional terminals END1, END2 or making available further, possibly more transmission-capacity-intensive services, the number of transmission channels can be adapted to the increased traffic volume by unblocking additionally provided channels, so that the latter are available for use by the terminals END1, END2.

The system SYS may further include a management unit VER. The management unit VER contains, for example, a processor with which it monitors the traffic volume in the entire system SYS. The system may have two or more channel assignment facilities EIN which are connected to the central server SER and the central management unit VER. In this manner, monitoring functions can be centralized at the management unit VER, which reduces the technical complexity. The management unit may monitor the transmission channels, e.g., by performing test measurements on idle channels, and then send to the facility EIN an instruction to block individual channels in a virtual fashion if, for example, these channels are faulty and a repair is necessary. To that end, the facility EIN includes an interface S3 to the management unit VER. The control unit CTRL is connected to this interface S3 and is suitable, for example, for receiving via this interface S1 information as to which transmission channels are to be blocked. The interface S3 serves as a protocol converter, as a send unit for transmitting information from the facility EIN to the management unit VER, and as a receive unit for receiving information from the management unit VER.

The control unit CTRL may be suitable for receiving, via the interface S3, information as to which minimum values and which maximum values are to apply to which group of terminals END1, END2. For example, the management unit VER monitors the current traffic volume and thereby determines those minimum and maximum values which make optimum use of a predetermined transmission capacity and offer maximum service to the terminals END1, END2.

The terminals END1, END2 are to be able to establish connections with a selectable number of transmission channels, or to request services for which different numbers of transmission channels are necessary. To that end, the control unit CTRL is programmed in such a way as to be suitable for detecting in the connection requests from individual terminals END1, END2 a corresponding number of requested transmission channels and for assigning the detected number of transmission channels to the respective terminal END1, END2 for the duration of the use of the respective service.

The facility EIN for assigning transmission channels further includes an interface S4 to the server SER. The control unit CTRL is connected to this interface S4 and is suitable for transmitting information as to which channels it has assigned to which terminal END1, END2 via the interface S4 to the server SER, so that the latter knows in which channel it is to make the requested service available. The interface S4 serves as a protocol converter, as a send unit for transmitting information from the facility EIN to the server SER, and as a receive unit for receiving information from the server SER. The facility may also establish contact with the server SER prior to the assignment of the transmission channels, e.g., to inquire how many channels are needed for a service requested from a terminal END1, END2.

In the embodiment, the system SYS is an all-electric one. The invention can also be used in a hybrid fiber/coax system. In that case, the facility is located, for example, in the server SER, and the interface S1 includes an electrical-to-optical converter to connect the facility EIN via a hub and several BONTs to a plurality of terminals END1.

What is claimed is:

1. A facility (EIN) for assigning transmission channels to terminals (END1, END2) of a service-on-demand system (SYS), characterized in that at least two interfaces (S1, S2) are provided for connecting the facility (EIN) to a plurality of terminals (END1, END2), each of the interfaces (S1, S2) being connected to a group of terminals (END1, END2) by a separate line, that a memory (MEMO) is provided which holds an assignment table containing entries on currently available and currently busy transmission channels for transmitting services requested from terminals (END1, END2), with a variable assignment of transmission channels to terminals (END1, END2) being possible regardless of which group the terminals (END1, END2) belong to, that a control unit (CTRL) is provided which is connected to the interfaces (S1, S2) and the memory (MEMO), and that the control unit (CTRL) is adapted to receive connection requests from individual terminals (END1, END2) for requesting services, to assign at least on& transmission channel to each of the individual terminals (END1, END2) in response thereto and store said assignment in the memory (MEMO) if in the memory the at least one transmission channel is considered currently available, and to notify the individual terminals (END1, END2) that the establishment of a connection is not possible for the time being if in the memory (MEMO) all transmission channels are considered busy.

2. A facility (EIN) as claimed in claim 1, characterized in that the control unit (CTRL) is adapted to carry out the assignment of the transmission channels in such a way that for each group of terminals (END1, END2), the number of assignable transmission channels does not fall below a minimum value and does not exceed a maximum value, with the minimum and maximum values being unequal, so that, if more transmission channels are requested from a group of terminals (END1; END2) than are predetermined by the maximum value, all transmission channels still available are considered busy for said a group, and that a minimum number of transmission channels are always freely available to each group of terminals (END1; END2).

3. A facility (EIN) as claimed in claim 2, characterized in that the control unit (CTRL) is adapted to change the minimum and maximum values dynamically.

4. A facility (EIN) as claimed in claim 3, characterized in that the control unit (CTRL) is adapted to temporarily block individual transmission channels in the memory (MEMO) in a virtual fashion, so that these transmission channels are considered busy.

5. A facility (EIN) as claimed in claim 3, characterized in that it further comprises an interface (S3) to a management unit (VER), and that the control unit (CTRL) is connected to this interface (S3) and is adapted to receive via this interface (S3) information as to which minimum values and which maximum values are to apply to which group of terminals (END1, END2).

6. A facility (EIN) as claimed in claim 4, characterized in that it further comprises an interface (S3) to a management unit (VER), and that the control unit (CTRL) is connected to this interface (S3) and is adapted to receive via this interface (S3) information as to which of the transmission channels are to be blocked in a virtual fashion.

7. A facility (EIN) as claimed in claim 6, characterized in that the control unit is adapted to detect a number of requested transmission channels in the connection requests from individual terminals (END1, END2), and to assign the detected number of transmission channels to the respective terminal (END1, END2) for the duration of the use of the respective service.

8. A facility (EIN) as claimed in claim 7, characterized in that it further comprises an interface (S4) to a server (SER), and that the control unit (CTRL) is connected to this interface (S4) and is adapted to transmit information via this interface (S4) to the server (SER) as to which transmission channels it has assigned to which terminal (END1, END2).

9. A facility (EIN) as claimed in claim 1, characterized in that the control unit (CTRL) is adapted to temporarily block individual transmission channels in the memory (MEMO) in a virtual fashion, so that these transmission channels are considered busy.

10. A facility (EIN) as claimed in claim 2, characterized in that it further comprises an interface (S3) to a management unit (VER), and that the control unit (CTRL) is connected to this interface (S3) and is adapted to receive via this interface (S3) information as to which minimum values and which maximum values are to apply to which group of terminals (END1, END2).

11. A facility (EIN) as claimed in claim 1, characterized in that the control unit is adapted to detect a number of requested transmission channels in the connection requests from individual terminals (END1, END2), and to assign the detected number of transmission channels to the respective terminal (END1, END2) for the duration of the use of the respective service.

12. A facility (EIN) as claimed in claim 1, characterized in that it further comprises an interface (S4) to a server (SER), and that the control unit (CTRL) is connected to this interface (S4) and is adapted to transmit information via this interface (S4) to the server (SER) as to which transmission channels it has assigned to which terminal (END1, END2).

* * * * *

UNITED STATES PATENT AND TRADEMARK OFFICE
CERTIFICATE OF CORRECTION

PATENT NO.    : 6,591,422 B1
DATED         : July 8, 2003
INVENTOR(S)   : Cesar et al.

It is certified that error appears in the above-identified patent and that said Letters Patent is hereby corrected as shown below:

<u>Title page,</u>
Item [56], References Cited, U.S. PATENT DOCUMENTS, "5,875,300", "394/200.49" should be -- 395/200.49 --

<u>Column 6,</u>
Line 34, "on &" should be -- one --

Signed and Sealed this

Thirteenth Day of January, 2004

JON W. DUDAS
*Acting Director of the United States Patent and Trademark Office*